(12) United States Patent
Szulyk et al.

(10) Patent No.: US 8,872,508 B2
(45) Date of Patent: Oct. 28, 2014

(54) METHOD AND APPARATUS FOR A HALF-BRIDGE VARIABLE DIFFERENTIAL TRANSFORMER POSITION SENSING SYSTEM

(75) Inventors: Zenon P. Szulyk, Mount Prospect, IL (US); Ganga P. Jayaraman, Buffalo Grove, IL (US); Brian M. Hahn, Mount Prospect, IL (US)

(73) Assignee: Woodward MPC, Inc., Skokie, IL (US)

( * ) Notice: Subject to any disclaimer, the term of this patent is extended or adjusted under 35 U.S.C. 154(b) by 502 days.

(21) Appl. No.: 13/345,048

(22) Filed: Jan. 6, 2012

(65) Prior Publication Data

US 2012/0176124 A1      Jul. 12, 2012

Related U.S. Application Data

(60) Provisional application No. 61/430,847, filed on Jan. 7, 2011.

(51) Int. Cl.
   *G01B 7/14*      (2006.01)
   *G01B 7/00*      (2006.01)

(52) U.S. Cl.
   CPC .................................... *G01B 7/003* (2013.01)
   USPC .................................................. 324/207.18

(58) Field of Classification Search
   None
   See application file for complete search history.

(56) References Cited

U.S. PATENT DOCUMENTS

| | | | |
|---|---|---|---|
| 3,234,491 A * | 2/1966 | Fritz | ............................... 336/30 |
| 3,626,283 A | 12/1971 | James | |
| 3,701,136 A | 10/1972 | Stevens | |
| 3,846,771 A | 11/1974 | Young et al. | |
| 4,134,065 A * | 1/1979 | Bauer et al. | ............... 324/207.18 |
| 4,141,149 A | 2/1979 | George et al. | |
| 4,394,711 A | 7/1983 | Conley | |
| 4,406,999 A | 9/1983 | Ward | |
| 4,623,840 A * | 11/1986 | Fujimura et al. | ......... 324/207.16 |
| 4,667,158 A | 5/1987 | Redlich | |
| 4,857,824 A * | 8/1989 | Tew | ............................... 323/347 |
| 4,866,378 A | 9/1989 | Redlich | |
| 4,912,409 A | 3/1990 | Redlich et al. | |
| 4,991,301 A | 2/1991 | Hore | |
| 5,214,378 A | 5/1993 | Hore | |

(Continued)

OTHER PUBLICATIONS

Hank Zumbahlen; Linear Variable Differential Transformers; Linear Circuit Design Handbook; 2008; 5 pages; Newnes.

(Continued)

*Primary Examiner* — Paresh Patel
(74) *Attorney, Agent, or Firm* — Reinhart Boerner Van Deuren P.C.

(57) ABSTRACT

A half-bridge variable differential transformer position sensing system that includes a transducer having a stator with an inductive coil having a center tap configured to provide an output signal. The transducer also has an armature with a magnetically permeable core configured to move within the inductive coil, such that movement of the magnetically permeable core causes a change in the output signal. The position sensing system includes a first circuit configured to provide an excitation signal at one terminal of the inductive coil. The system includes no more than three electrical interface wires, and a microcontroller configured to calculate the degree of change in the position of the magnetically permeable core, and is configured to correct for variations in the voltage of the output signal due to the temperature of the transducer and due to non-linear effects on the output signal caused by movement of the magnetically permeable core.

30 Claims, 8 Drawing Sheets

(56) References Cited

U.S. PATENT DOCUMENTS

| | | |
|---|---|---|
| 5,245,869 A | 9/1993 | Clarke et al. |
| 5,291,115 A | 3/1994 | Ehsani |
| 5,332,966 A | 7/1994 | Berberich |
| 5,410,235 A | 4/1995 | Ehsani |
| 5,497,081 A | 3/1996 | Wolf et al. |
| 5,497,147 A | 3/1996 | Arms et al. |
| 5,818,223 A | 10/1998 | Wolf |
| 5,986,419 A | 11/1999 | Archer et al. |
| 6,097,183 A | 8/2000 | Goetz et al. |
| 6,522,128 B1 | 2/2003 | Ely et al. |
| 6,674,280 B1 | 1/2004 | Goetz et al. |
| 6,693,422 B2 | 2/2004 | Lutz |
| 6,781,366 B2 | 8/2004 | Hiramatsu et al. |
| 6,812,694 B2 | 11/2004 | Uenoyama |
| 6,979,966 B2 | 12/2005 | Barrenscheen et al. |
| 7,141,966 B2 | 11/2006 | Sumiya et al. |
| 7,159,298 B2 | 1/2007 | Lieberman |
| 7,489,096 B2 | 2/2009 | Gianone |
| 7,626,384 B2 | 12/2009 | Hinz |
| 7,652,469 B2 | 1/2010 | Meyer |
| 2004/0221896 A1 | 11/2004 | Ballenger et al. |

OTHER PUBLICATIONS

Michael De Volder et al.; Characterization and control of a pneumatic microactuator . . . ; publication; Jan. 15, 2008; Elsevier B.V., Sensors and Actuators A: Physical, (2008) 141 SEACTA 1 192-200, pp. 192-200 vol. 141 No. 1 ISSN: 0924-4247.

* cited by examiner

METHOD AND APPARATUS FOR A HALF-BRIDGE VARIABLE DIFFERENTIAL TRANSFORMER POSITION SENSING SYSTEM

CROSS-REFERENCE TO RELATED PATENT APPLICATIONS

This patent application claims the benefit of U.S. Provisional Patent Application No. 61/430,847, filed Jan. 7, 2011, the entire teachings and disclosure of which are incorporated herein by reference thereto.

FIELD OF THE INVENTION

This invention generally relates to position sensors, and, more particularly, to position sensors suitable for aerospace applications.

BACKGROUND OF THE INVENTION

In aerospace applications, it is generally desirable to minimize the weight of all components on an aircraft. Less weight translates into reduced fuel consumption and lower operating costs. Two commonly used position sensors for aerospace applications are the linear variable differential transformer (LVDT) and the rotary variable differentiable transformer (RVDT). These types of sensors are used in aerospace applications particularly due to their ability to perform under harsh environmental conditions with high reliability and accuracy. However, conventional LVDT and RVDT sensors may have four to six interfacing wires per sensor. These sensors typically use five wires at the electrical interface for excitation of the primary coil and outputs from the secondary coils. When a large number of these sensors are used for the purpose of providing redundancy, the number and length of the wires connecting the signals to the electronics tend to complicate the system wiring and increase the overall weight. They also increase the likelihood of a break in one of the wires at the terminations within the transducer.

Further, when employing these sensors, the user must consider the best means for correcting variation in output data due to variations in temperature. The transducer output at a fixed position of the moving member changes when the operating temperature increases or decreases from standard room temperature. This is because the resistivity of copper of which the coil wires are made is a function of temperature, and this affects the transducer output voltage. Moreover, the change in the transducer output with temperature is also dependent on the position of the moving member. Thus the transducer output is a nonlinear two dimensional function of position and temperature.

The user must also consider the best means for correcting variation in output data due to the nonlinearity of the transducer output with respect to the position of the moving member.

Embodiments of the invention represent an advancement over the state of the art with respect to position sensors used in aerospace applications. These are described briefly below.

BRIEF SUMMARY OF THE INVENTION

In one aspect, embodiments of the invention provide a half-bridge variable differential transformer position sensing system that includes a transducer having a stator with an inductive coil having a center tap configured to provide an output signal. The transducer also has an armature with a magnetically permeable core configured to move within the inductive coil, such that movement of the magnetically permeable core causes a change in the output signal. The position sensing system includes a first circuit configured to provide an excitation signal at one terminal of the inductive coil. The position sensing system further includes a microcontroller configured to calculate the degree of change in the position of the magnetically permeable core based on a comparison of a voltage of the output signal and a voltage of the excitation signal. Further, the microprocessor is configured to correct for variations in the voltage of the output signal due to the temperature of the transducer and due to non-linear effects on the output signal caused by movement of the magnetically permeable core. Further, no more than three electrical wires are used to operate the half-bridge variable differential transformer position sensing system.

In a particular embodiment of the position sensing system, the no more than three electrical wires includes a first wire to supply the excitation signal to the inductive coil, a second ground wire connected to the inductive coil, and a third wire to carry a transducer output signal.

In a further embodiment, the transducer comprises a stator having first and second inductive coils wound on a bobbin, the first and second coils connected in series with a center tap coupled between the first and second coils, the stator being housed in a protective casing with a bore configured to accommodate the magnetically permeable core. In particular embodiments, the armature comprises a magnetically permeable core attached to a non-metallic shaft, wherein movement of the non-metallic shaft is transferred to the magnetically permeable core. In certain embodiments, the movement of the magnetically permeable core within the bore of the stator is linear, while in alternate embodiments, the movement of the magnetically permeable core within the bore of the stator is rotational.

In a particular embodiment, the position sensing system further includes signal conditioning circuitry to make a transducer output signal suitable for analog-to-digital conversion. In a more particular embodiment, the signal conditioning circuitry for making the transducer output signal suitable for analog-to-digital conversion includes circuitry configured to rectify and smooth the transducer output signal. In a further embodiment, the microcontroller is programmed to rectify and smooth the transducer output signal. In a more particular embodiment, the signal conditioning circuitry includes AC signal conditioning circuitry and DC signal conditioning circuitry. In an additional embodiment, the position sensing system further includes one or more analog-to-digital converters coupled to the signal conditioning circuitry.

In a particular embodiment, the microcontroller is programmed to correct for variations in the voltage of the output signal due to the temperature of the transducer by using a temperature correction table to calculate a temperature correction factor. In a further embodiment, the microcontroller is programmed to correct for variations in the voltage of the output signal due to non-linear effects on the output signal caused by movement of the magnetically permeable core by using a calibration table to calculate a linearity compensation factor.

In a particular embodiment, the position sensing system further includes a DC reference signal generator coupled between the transducer and the microcontroller, wherein an output of the DC reference signal generator is included in the excitation signal. In a more particular embodiment, the microcontroller is programmed to detect short circuits and open circuits in the inductive coil by comparing the actual DC bias in the transducer output signal to the expected DC bias.

In an additional embodiment, the position sensing system includes an AC reference signal generator coupled between the transducer and the microcontroller, wherein an output of the AC reference signal generator is included in the excitation signal.

In a particular embodiment, the microcontroller is configured to provide a digital output signal providing positional data for a member physically connected to the magnetically permeable core. In a more particular embodiment, data of the digital output signal is transmitted serially in using one of the RS-232, ARINC 429, MIL-STD 1553, and CAN-bus communications standards. In a further embodiment, the positioning system includes a line driver configured to provide the digital output signal to an on-board computer or host PC.

In another aspect, embodiments of the invention provide a method of sensing position using a variable differential transformer position sensing system. The method includes providing a transducer having an inductive coil which supplies a transducer output signal, and attaching a part, whose position is to be sensed, to a magnetically permeable core located within the inductive coil. In an embodiment of the invention, the method also includes generating an excitation voltage to be applied to the inductive coil, and measuring variation in transducer output signal voltage resulting from a movement of the magnetically permeable core. Further, embodiments of the invention include correcting for effects of temperature and non-linearity when determining a degree of movement of the magnetically permeable core, and providing no more than three wires as an electrical interface for the variable differential transformer position sensing system.

In a particular embodiment, measuring variation in transducer output signal voltage resulting from a movement of the magnetically permeable core includes measuring variation in transducer output signal voltage resulting from linear movement of the magnetically permeable core. In an alternate embodiment, measuring variation in transducer output signal voltage resulting from a movement of the magnetically permeable core includes measuring variation in transducer output signal voltage resulting from rotational movement of the magnetically permeable core.

In a particular embodiment, the method also includes conditioning the transducer output signal to make the signal suitable for analog-to-digital conversion, converting the transducer output signal from analog to digital form, and inputting the digital form of the transducer output signal into signal processing algorithms in a microcontroller. In a more particular embodiment, conditioning the transducer output signal includes providing circuitry for AC signal conditioning and for DC signal conditioning. In an even more particular embodiment, providing circuitry for AC signal conditioning and for DC signal conditioning includes circuitry for AC and DC signal conditioning that is coupled between the transducer and a microcontroller.

In a certain embodiment, the method also includes detecting short circuits or open circuits in the inductive coil by comparing a measured DC bias in the transducer output signal to an expected DC bias for the transducer output signal. In a more particular embodiment, correcting for effects of temperature includes programming a microcontroller to calculate a temperature correction factor using a temperature correction table. In a further embodiment, correcting for effects of non-linearity includes programming a microcontroller to calculate a linearity compensation factor using a calibration table.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Conventional new position transducers that attempt to reduce the number of wires connected to the transducer may sacrifice the reliability, or at the very least the accuracy and self-compensating features of a conventional linear variable differential transformer (LVDT) and a conventional rotational variable differential transformer (RVDT). This may require that these features be brought in by the end user of these sensors through additional custom electronics and additional application software. This tends to result in increased parts count and greater complexity of the overall system, and, therefore, reduced reliability. It also tends to shift the burden of correcting these transducer errors to the end user.

Figure 1:
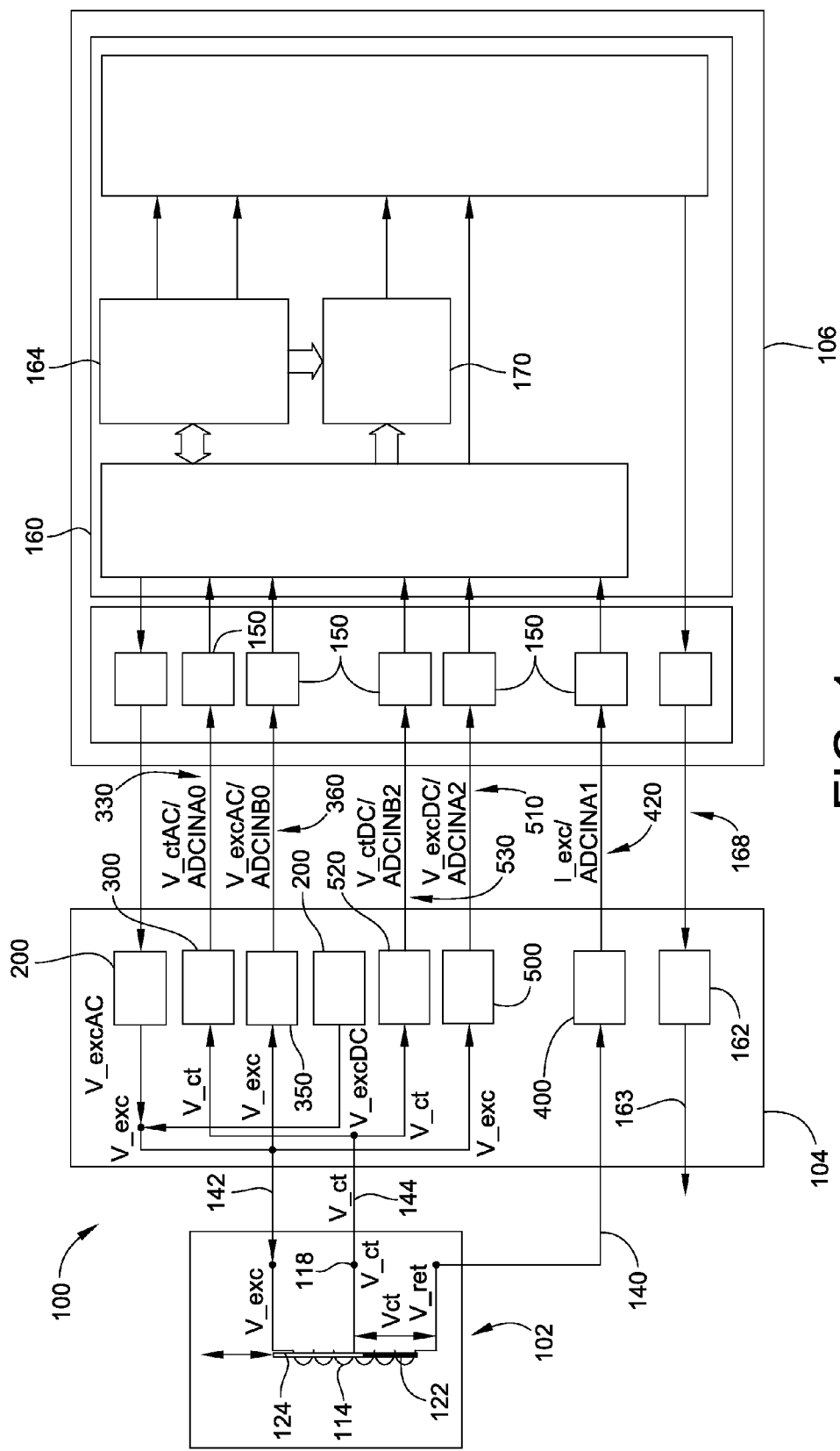
FIG. 1 is a schematic system block diagram of a half-bridge variable differential transformer position sensing system, according to an embodiment of the invention.

FIG. 1 shows a schematic system block diagram for a half-bridge variable differential transformer position sensing system 100, also called a half-bridge LVDT, to measure linear displacements, according to an embodiment of the invention. A transducer 102 is shown to the left and is simply a conceptual representation of the device in FIG. 1. The signal conditioning subsystem 104 to the right represents the analog electronics required to generate the excitation signal for the coil 114 (shown in FIG. 1) and also process the output signal from the transducer 102. The signal processing electronics in the microcontroller 106 is realized using digital electronics. In the case of digital circuitry, such as that illustrated in FIG. 1, some of the functional blocks in this subsystem may be realized using software. The signal conditioning subsystem 104 is coupled to a microcontroller 106, which processes the signals from the signal conditioning subsystem 104 and generates a system output. In a particular embodiment of the invention, the microcontroller 106 may be a digital signal processor (DSP). The same system block diagram may represent the system for a half-bridge variable inductance position sensing system 100 to measure rotary displacements, also called a half-bridge rotary variable differential transformer (RVDT).

Figure 2:
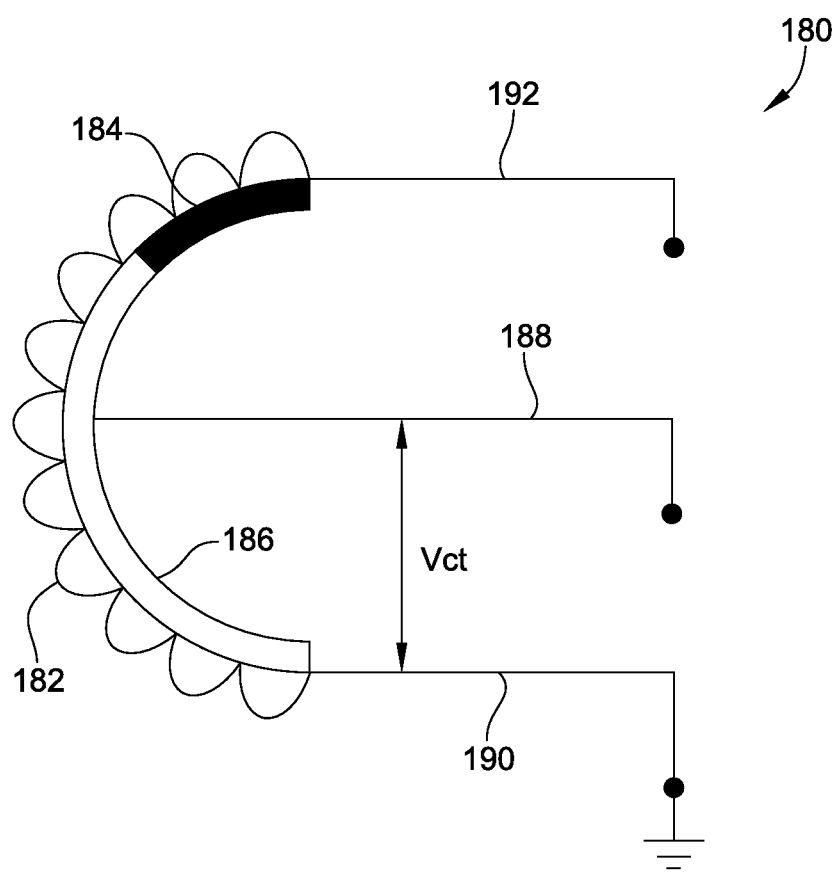
FIG. 2 is a schematic diagram of a transducer for a rotary variable differential transformer, according to an embodiment of the invention.

FIG. 2 is a schematic diagram of a transducer 180 for an RVDT, according to an embodiment of the invention. The transducer 180 includes a curved coil 182 and a curved, magnetically permeable core 184 disposed within the coil 182. The core 184 is attached to a curved, non-magnetic rod 186, which, in turn, is attached to the device whose rotation is being measured. The transducer 180 has a center tap 188, a ground wire 190, and a third wire 192 for supplying an excitation signal. The signal conditioning subsystem for an RVDT is functionally the same as that shown in FIG. 1 for the half-bridge LVDT 100, though some minor changes may be required to accommodate the slightly different electrical characteristics of an RVDT transducer.

Figure 3:
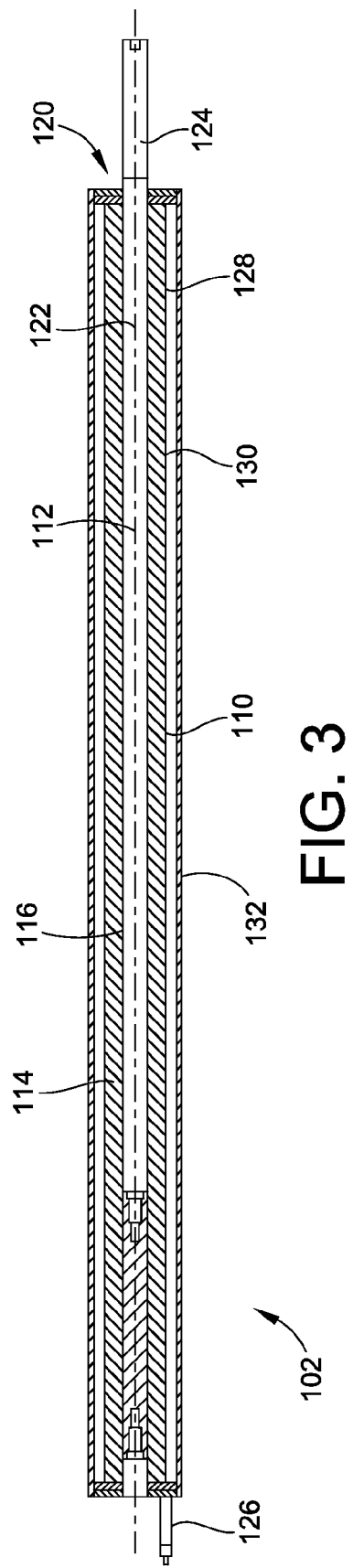
FIG. 3 is a cross-sectional view of the transducer incorporated into the half-bridge variable differential transformer position sensing system of FIG. 1.

FIG. 3 illustrates a plan view of the transducer 102, which has a stator 110 and an armature 112. In a particular embodiment of the invention, the stator 110 consists of a pair of coils 114 wound on a bobbin 116 and connected in series with a center tap 118 (shown in FIG. 1) brought out to the interface. The stator 110 is housed in a protective casing and has a cylindrical bore 120. The armature 112 consists of a magnetically permeable core 122 attached to a rigid non-magnetic metallic rod or shaft 124 that allows the core 122 to be moved in and out of the bore 120. In certain embodiments, the non-magnetic rod 124 may be made non-metallic. The measurement performed by the half-bridge LVDT 100 is based upon the principle of mutual magnetic induction between the pair of coils 114 that is facilitated by the movable, magnetically permeable armature 112.

In an alternate embodiment of the invention, the transducer 102 is a coil-type inductor whose inductance varies with respect to the position of the armature 112, which moves along the coil axis. For a linear transducer 102, the armature 112 consists of the core 122 made of magnetically permeable material and attached to the non-magnetic rod 124. The rod 124 is, in turn, attached, using a threaded fastener for example, to the device (not shown) whose linear position is to be measured. For a rotary transducer, the core is cylindrical with discretely varying diameters around its circumference and attached to a shaft that is fastened to the device whose rotary position is to be measured.

In a particular embodiment, the stator 110 consists of a single coil 114 wound on a bobbin or spool tube 116 in one section or two sections in series in a voltage divider configuration, and with terminations 126 at the coil ends and a center tap 118 (in FIG. 1). In certain embodiments, the wound spool is covered with an insulating layer 128 and a return shield 130. The stator 110 is then encased in a stainless steel or aluminum alloy housing 132. One end of the coil is electrically grounded and an AC excitation voltage is applied across the coil 114 at the other end. The ratio of the voltage at the center tap 118 with respect to ground to the excitation voltage across the coil 114 is proportional to the displacement of the core 122. The manufacture of the coil 114, housing 132, and the armature 112 follows a similar design and process as that for a standard LVDT or RVDT. Thus, the present invention provides the same advantages as a conventional LVDT or RVDT in terms of mechanical robustness and environmental survivability.

Referring again to FIG. 1, it can be seen that the electronics interface with the transducer 102 has three wires. A first wire 140 is electrically grounded, a second wire 142 supplies the AC excitation signal, and a third wire 144 receives the output voltage from the center tap 118 of the transducer 102. The output voltage from the center tap 118 is low-pass-filtered and the offset is removed before inputting it to the rectifier. The excitation signal is also similarly rectified. The ratio of the output voltage to the excitation voltage is calculated, and this is proportional to the transducer displacement. As will be explained below, additional functionality such as linearity correction and temperature compensation may also be performed depending on the characteristics of the particular transducer. Open winding faults are determined by comparing the output voltage to the minimum and maximum thresholds. To detect shorted winding faults, a DC bias voltage is superposed to the excitation signal. The built-in test (BIT) circuitry measures the DC voltage at the center-tap, and a fault is annunciated if it is less or more than half of the applied bias.

Figure 4:
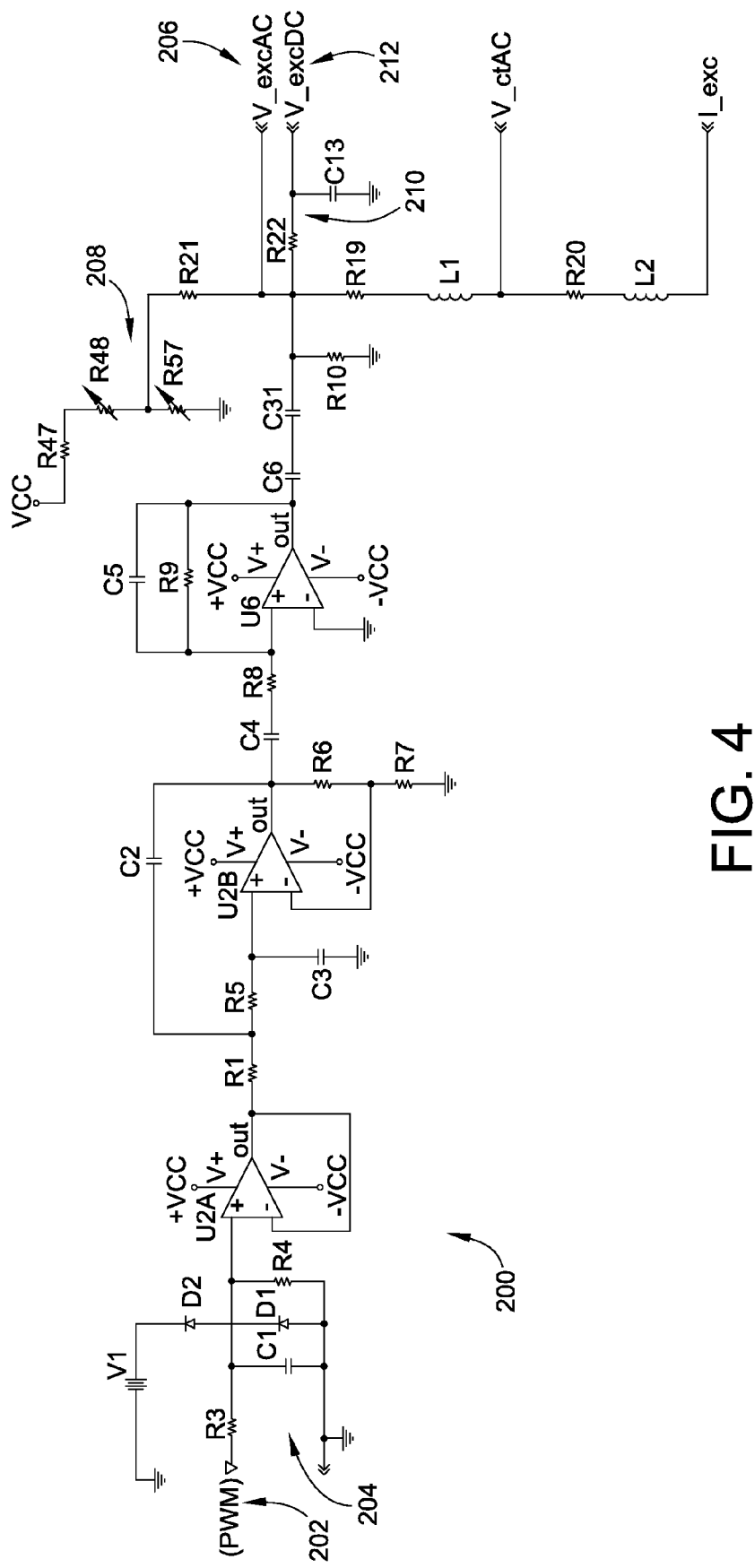
FIG. 4 is a schematic diagram of reference signal generator circuit, according to an embodiment of the invention.

FIG. 4 is a schematic diagram of reference signal generator circuit 200, according to an embodiment of the invention. In a particular embodiment, in which the reference signal generated is an AC signal, a pulse-width modulation (PWM) signal 202 from a digital signal processor (DSP) 160 (see FIG. 1) is first filtered using a passive filter 204 consisting of R3 and C1 with cutoff frequency of 19.4 kHz. The PWM signal 202 is then clipped using a pair of diodes (D1 and D2), and a reference voltage of 3.3V obtained from the DSP 160. In the embodiment shown, resistor R3 provides a high input impedance of 100 kilohms, for example. For example, a 2.5 kHz reference sine wave may be recovered by smoothing the PWM signal 202 using a low-pass filter of the Sallen-Key type. In certain embodiments, the low-pass filter has a second order transfer function with a cut off frequency of 10.6 kHz. Typically, the transducer coil 114 (see FIG. 1) has a nominal AC impedance of 1.7 kilohms at the oscillator frequency of 2.5 kHz. A power amplifier may supply the necessary current. The output signal 206 is AC-coupled by using two electrolytic capacitors to block any DC offset which would have a low impedance path to ground through the transducer coil 114. The two capacitors are shown in the schematic of FIG. 4 as C6 and C31.

The reference signal generator circuit 200 of FIG. 4 can also be used as a DC reference signal generator. The DC reference signal is generated for two reasons: 1) electrical short and open circuit detection; and 2) calculation of the DC resistance of the coil which is in turn used to estimate the coil temperature. The DC reference signal is derived from the +12 $V_{DC}$ reference using a resistor divider 208. A resistor R21, of 500 ohms for example, appears in series with the resistor divider 208 (R46 and R57) in order to provide sufficiently high input impedance to the DC source. Note that R46 and R57 together is one potentiometer even though the schematic displays them as two separate pots. FIG. 4 also shows a low-pass filter 210 consisting of R22 and C13 which filter the AC component out of the excitation signal, and results in a signal V_excDC 212.

Figure 5A:
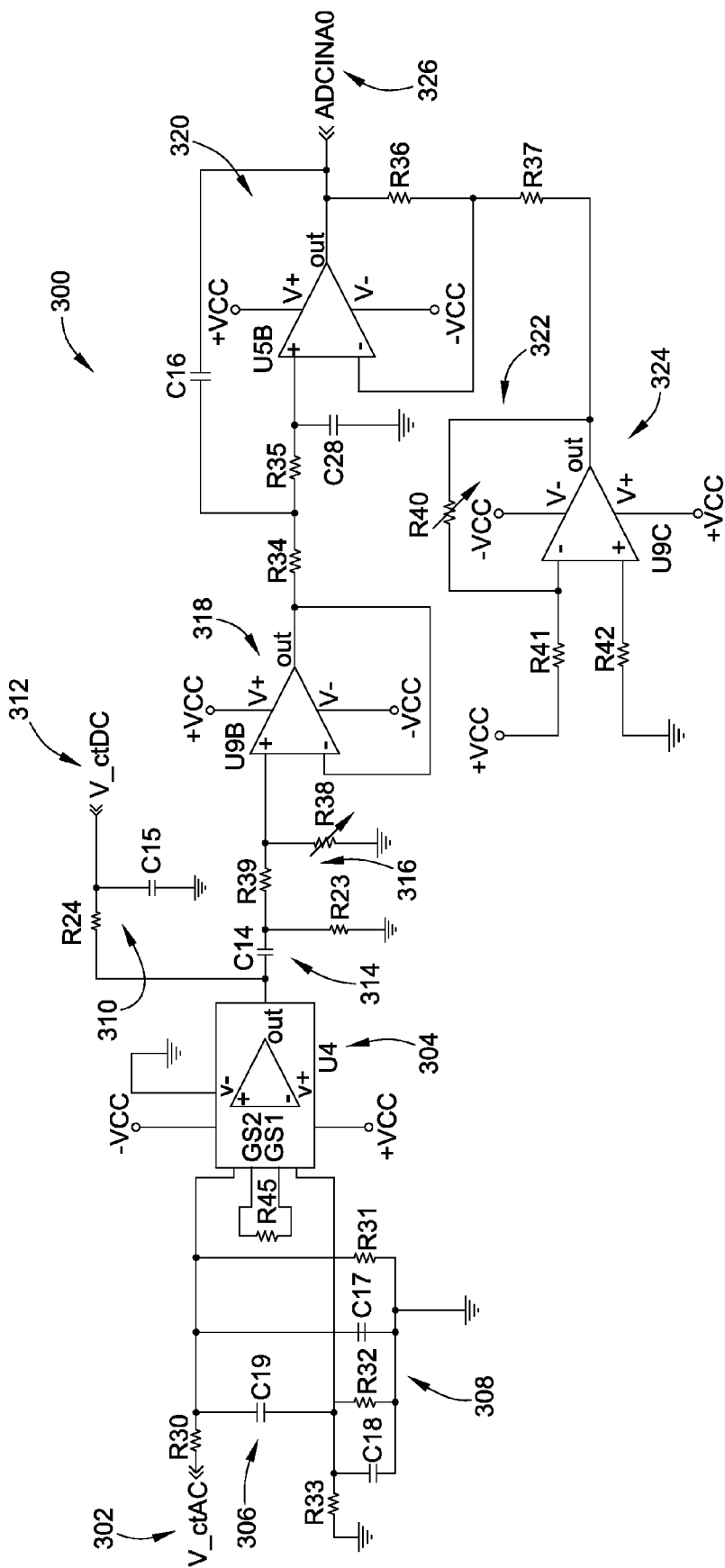
FIGS. 5A and 5B are schematic diagrams of AC input voltage conditioning circuits, according to an embodiment of the invention.
Figure 5B:
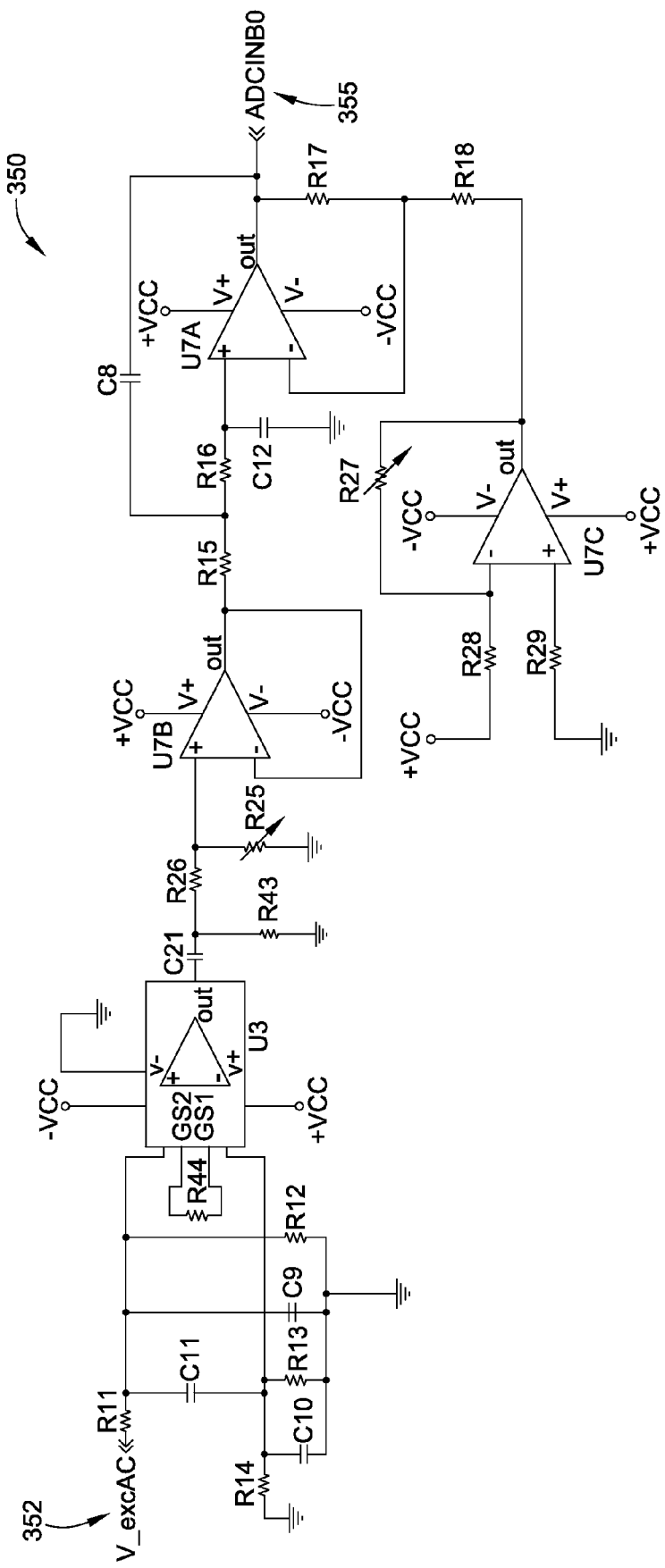

FIGS. 5A and 5B show a pair of signal conditioning circuits 300, 350, constructed in accordance with an embodiment of the invention. The two signals being conditioned in these circuits are the signal from the transducer center tap 118 (see FIG. 1) namely V_ctAC 302 and the excitation signal V_excAC 352. We will describe the signal conditioning circuit 300 for the V_ctAC signal shown in FIG. 5A. V_ctAC 302 is connected to an instrumentation amplifier 304. In a particular embodiment, a differential mode signal is filtered using passive filter 306 (R30, R33 and C19) with a cutoff frequency of 36.1 kHz, and the common mode signal is filtered using passive filter 308 (R30 and C17, and R33 and C18) with a cutoff frequency of 330 kHz. In this embodiment, a low-pass filter 310 consisting of R24 and C15 is used to filter out the AC component from V_ctAC and obtain the DC bias V_ctDC 312. A high-pass filter 314 consisting of C14 and R23 is used to filter out the DC bias in V_ctAC, and this is the signal that is eventually rectified.

A resistor divider 316, consisting of R38 and R39, is used to scale the signal so that the peak to peak value is within 3V, as required by the analog-to-digital converter (ADC) 150 (see FIG. 1). Op Amp U9B 318 serves as a buffer to maintain the scaled value under different loads. Prior to being read into the ADC 150, the signals V_ctAC 302 and V_excAC 352 must be low-pass-filtered to remove frequency components that might be aliased by sampling. In certain embodiments, the sampling rate is 80 kHz, which implies that frequencies of 40 kHz and higher must be removed. In a particular embodiment, an anti-aliasing filter 320 is of the Sallen-Key type and is second order with a cut-off frequency of 12.835 kHz. Finally, a level shifter 322 may be used to keep the output of the Sallen-Key filter 320 in the 0-3V range required by the ADC 150. This is done using Op Amp U9C 324 and potentiometer R40. The output signal ADCINAO 326 is read by the ADC 150 into channel ADCINAO 330 (see FIG. 1). The excitation signal V_excAC 352 is likewise processed and the output signal ADCINBO 355 is read by the ADC 150 into channel ADCINBO 360 (see FIG. 1).

Figure 6:
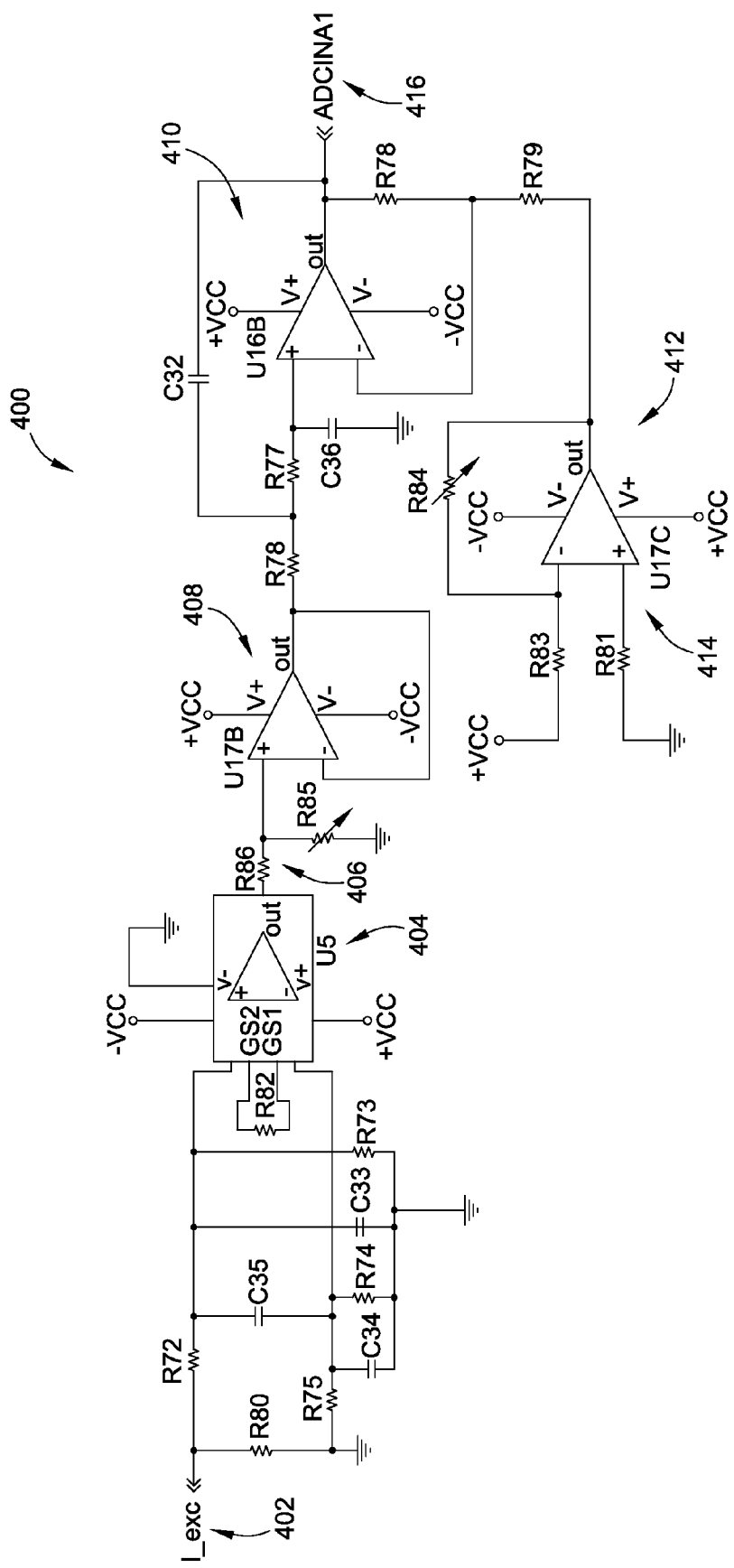
FIG. 6 is a schematic diagram of a DC coil current conditioning circuit, according to an embodiment of the invention.

FIG. 6 shows a schematic diagram of a DC coil current conditioning circuit 400, constructed in accordance with an embodiment of the invention. The excitation signal 402, I_exc, signal being conditioned in this circuit is sent through R80 (in one embodiment a 10-ohm resistor), which is connected across the inputs of an instrumentation amplifier 404. Since the purpose is to measure the DC component of the excitation current, differential and common mode signals may be filtered using passive filters with exemplary cutoff frequencies of 0.8 Hz and 1.6 Hz, respectively. A resistor R82, having an exemplary value of 500 ohms, is connected across inputs 1 and 8 of instrumentation amplifier 404 to obtain a gain of 101. A resistor divider 406, including resistors of R85 and R86, is used to scale the output signal of instrumentation amplifier 404 so that the peak to peak value is within 3V required by the ADC 150 (see FIG. 1). Op Amp U17B 408 serves as a buffer to maintain the scaled value under different loads.

Prior to being read into the ADC 150, the signal I_exc 402 is low-pass-filtered to remove frequency components that might be aliased by sampling. In a particular embodiment, the sampling rate is 80 kHz, which implies that frequencies of 40 kHz and higher must be removed. In a more particular embodiment, an anti-aliasing filter 410 is of the Sallen-Key type and is a second order filter with a cut-off frequency of 12.835 kHz. Finally a level shifter 412 is required to keep the output of the Sallen-Key filter 410 in the 0-3V range required by the ADC 150. This is done using Op Amp U17C 414 and potentiometer R84. The output ADCINA1 416 is read by the ADC 150 to channel ADCINA1 420 (see FIG. 1).

Figure 7A:
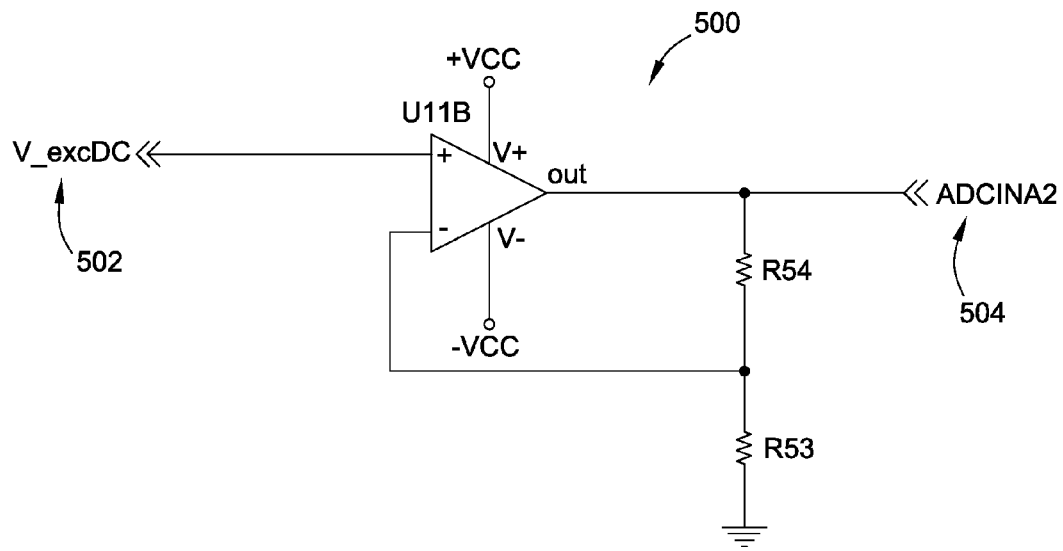
FIGS. 7A and 7B are schematic diagrams of DC input voltage conditioning circuits, according to an embodiment of the invention; and While the invention will be described in connection with certain preferred embodiments, there is no intent to limit it to those embodiments. On the contrary, the intent is to cover all alternatives, modifications and equivalents as included within the spirit and scope of the invention as defined by the appended claims.
Figure 7B:
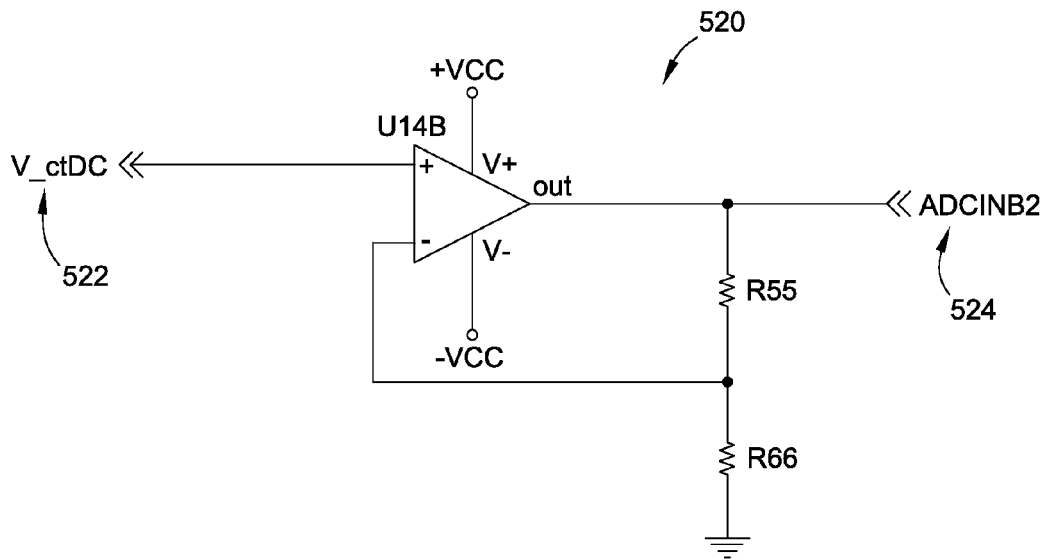

FIGS. 7A and 7B shows schematic diagrams of two DC input voltage conditioning circuits 500, 520, constructed in accordance with an embodiment of the invention. These DC input voltage conditioning circuits 500, 520 are designed to scale the signals V_ctDC 522 and V_excDC 502 so that they lie within the input range of 0-3V for maximum usage of the resolution capability of the ADC 150 (see FIG. 1). A gain of approximately four is set by the resistors R53 and R54 for V_excDC 502 and the resistors R55 and R66 for V_ctDC 522. The outputs ADCINA2 504 and ADCINB2 524 of the scaling stage are read by the ADC 150 into channels ADCINA2 510 (see FIG. 1) and ADCINB2 530 (see FIG. 1), respectively.

Referring again to FIG. 1, it can be seen that a line driver circuit 162 is used for serial communication between the digital signal processor 160 and a host PC (not shown). As shown in FIG. 1, the line drive circuit 162 is connected to a serial communications interface (SCI) port 168 of the digital signal processor 160. In certain embodiments, the output 163 of the line drive circuit 162 is connected to a serial port of the host PC.

Referring again to FIG. 1, in operation, the half-bridge LVDT 100 may employ a 2.5 kHz reference signal, which can be generated using a look-up table containing eight points per quadrant of the sine function, thus giving a required PWM update rate of 80 kHz. The process by which signals generated by the transducer 102 are subsequently processed by the microcontroller 106 is described below, according to embodiments of the invention.

A first general purpose timer may be programmed to produce the PWM time base at 513 kHz frequency, for example, and the duty cycle can be modulated by an interrupt service routine (ISR) generated in the microcontroller 106, and triggered from a second general purpose timer, running at 80 kHz for example. This gives a high sampling rate relative to the reference signal frequency, hence the cutoff frequency for the anti-aliasing filter could be set fairly high.

An 80 kHz ISR update rate means that the ISR has to be completed in 12.5 microseconds. At a CPU clock frequency of 150 MHz, that is equivalent to 1,875 single cycle instructions. In a particular embodiment, the signal conditioning ISR is triggered by a period event from the second general purpose timer. This period event is also used to begin a sequence of ADC conversions. Thus, A-to-D conversion can be initiated purely by a hardware timer event, ensuring that the sampling process is not affected by interrupt jitter or software latency. The ADC conversion time is about 200 nanoseconds, so the ADC 150 is able to keep pace with the ISR quite easily. The ISR runs a smoothing filter to remove noise in the ADC channel corresponding to the transducer 102 output due to the proximity of the PWM signal. Then, in particular embodiments, it calculates the DC bias by running a 128-point moving-average filter. The DC bias is then removed from the input signal to yield a pure AC sinusoid. The DC bias for the transducer 102 excitation signals, and for the transducer 102 current signals, are likewise removed. On the other hand, the ADC channels corresponding to the transducer 102 DC bias and the transducer 102 DC output signals are smoothed to remove noise and ripple.

In the microcontroller 106, the transducer excitation and output signals are then rectified by simply reversing the sign of their negative half cycles. The rectified signals are then smoothed and filtered using a 256-point moving-average filter. This gives the average value of the rectified signals. The ratio of the output average to the excitation average is calculated and filtered again using a 1024-point moving-average filter. This ratio is proportional to the linear or rotary displacement of the core 122 in the transducer 102. The calculated ratio of the output average to the excitation average is then corrected for temperature, and a look-up table and interpolation algorithm is used to calculate the transducer displacement in inches. The ISR ends by writing a new value for the duty cycle for the PWM signal generating using the first general purpose timer. The value is obtained from a 32-point sine look up table indexed by a counter that keeps track of the number of entries into the ISR. This counter is reset to 0 after counting up to 31.

In a particular embodiment, a software counter is used to maintain a 100-microsecond timer which triggers a function that causes a temperature and resistance module 164 in the microcontroller 106 to calculate the resistance of the transducer coil 114 and its temperature. This is done to correct for errors in the transducer 102 output due to temperature changes. Additionally, the microcontroller 106 is programmed to filter the DC excitation and the DC output signals and perform a BIT to check for shorted turn or an open circuit fault in the transducer coil 114.

Once the ADC value is read in, the input may be smoothed using, for example, a 4-point moving average filter. This removes noise in the input due to the proximity of the excitation signal. In particular embodiments, the filter uses a 4-point circular buffer with a single pointer keeping track of the current index into the circular buffer. A running average of the 4 points can be computed at each entry into the ISR, as this will give the smoothed value of the input.

The excitation signal and the output signal from the transducer 102 are then rectified. In particular embodiments, this is achieved by a simple logic that checks to see if the value of the signal is negative, and, if so, it reverses the sign of its value.

The rectified excitation signal and the rectified output signal from the transducer 102 are then smoothed using an 8-point moving average filter. This removes noise in the signals due to incorrect sign reversals. The filter used an 8-point circular buffer with a single pointer keeping track of the current index into the buffer. A running average of the 8 points is computed at each entry into the ISR. This gives the smoothed value of the signals. In a particular embodiment, in order to remove the ripple, the rectified excitation signal and the rectified output signal are filtered with a 256-point moving average filter after the smoothing stage. The filter used a 256-point circular buffer with a single pointer keeping track of the current index into the buffer. A running average of the 256 points is computed upon each entry into the ISR.

A ratio of the filtered rectified output signal to the filtered rectified excitation signal is then calculated. In a particular embodiment, the result is scaled by 1024 to minimize truncation error during division. The calculated ratio is then filtered using a 1024-point moving-average filter. The filter used a 1024-point circular buffer with a single pointer keeping track of the current index into the buffer. A running average of the 1024 points is computed at each entry into the ISR The signal conditioning ISR also reads the value of the DC component of the excitation current, the DC component of the excitation voltage and the DC component of the transducer output from the ADC 150 (see FIG. 1). In particular embodiments, these signals are filtered using a 128-point moving-average filter. These filters may be configured to use a 128-point circular buffer with a single pointer keeping track of the current index into the buffer. A running average of the 128 points is computed upon each entry into the ISR. These averages are used in the calculation of resistance by temperature and resistance module 164, and in detecting faults by fault diagnostics module 170, for example.

In certain embodiments, the rectified and filtered excitation signal and the rectified and filtered transducer output signal are again filtered using a 128-point moving-average filter. The purpose is to remove jitters in the displayed value on the monitor screen so that a stable value can be read. Note that the filtered output thus obtained is used only for display. It is not used in the position calculation. In embodiments, the filter uses a 128-point circular buffer with a single pointer keeping track of the current index into the buffer. In a particular embodiment of the invention, a running average of the 128 points is computed upon each entry into the ISR.

Next, the filtered value of the DC component of the excitation current obtained from the signal conditioning ISR is filtered again using a 32-point moving average filter. Similarly, the DC component of the excitation voltage, and the DC component of the transducer 102 output are thus filtered. This gives a stable value that can be used in the calculation of resistance by temperature and resistance module 164, and in the detection of faults by fault diagnostics module 170, for example.

Since the error in the transducer output with respect to temperature also changes with the transducer 102 position, a two-dimensional look-up table was used to determine the correction factor to be applied to the transducer output. This table was constructed using data obtained from thermal tests. For a specific transducer 102 position, the entry in the table consists of the error in the transducer output at a particular temperature with respect to the transducer output at room temperature which was assumed to be 20 deg C.

The injection of a DC voltage into the excitation signal, and the measurement of the current passing through the coil allow us to detect various kinds of electrical faults in the coil 114. Since, in certain embodiments, this functionality is implemented in software, it allows for the implementation of fairly sophisticated logic that identifies and isolates the fault. Upon detection, the fault may also be annunciated through the serial link, and may also be logged for later analysis. Upon entry into the fault detection function, the code steps through the sequential testing of the coil faults. The function related to fault testing is executed at a period of 100 microseconds in the background of the signal conditioning ISR. Since the frame utilization of the ISR is only about 50%, this allows plenty of time for the fault testing to complete.

Significant variables, including the transducer 102 position, coil temperature and resistance, and fault statuses and flags are converted to serial data packets and sent to the SCI module to be transmitted over the RS232 channel. In addition to the RS232 communications protocol, CAN, MIL-STD-1553, or ARINC may also be used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A half-bridge variable differential transformer position sensing system comprising:
    a transducer having a stator with an inductive coil having a center tap configured to provide an output signal, the transducer having an armature with a magnetically permeable core configured to move within the inductive coil, wherein such movement causes a change in the output signal;
    a first circuit configured to provide an excitation signal at one terminal of the inductive coil; and
    a microcontroller configured to calculate the degree of change in the position of the magnetically permeable core based on a comparison of a voltage of the output signal and a voltage of the excitation signal, the microprocessor being further configured to correct for variations in the voltage of the output signal due to the temperature of the transducer and due to non-linear effects on the output signal caused by movement of the magnetically permeable core;
    wherein no more than three electrical wires are used to operate the half-bridge variable differential transformer position sensing system.

2. The half-bridge variable differential transformer position sensing system of claim 1, wherein the no more than three electrical wires includes a first wire to supply the excitation signal to the inductive coil, a second ground wire connected to the inductive coil, and a third wire to carry a transducer output signal.

3. The half-bridge variable differential transformer position sensing system of claim 1, wherein the transducer comprises a stator having first and second inductive coils wound on a bobbin, the first and second coils connected in series with a center tap coupled between the first and second coils, the stator being housed in a protective casing with a bore configured to accommodate the magnetically permeable core.

4. The half-bridge variable differential transformer position sensing system of claim 3, wherein the armature comprises a magnetically permeable core attached to a non-metallic shaft, wherein movement of the non-metallic shaft is transferred to the magnetically permeable core.

5. The half-bridge variable differential transformer position sensing system of claim 4, wherein the movement of the magnetically permeable core within the bore of the stator is linear.

6. The half-bridge variable differential transformer position sensing system of claim 4, wherein the movement of the magnetically permeable core within the bore of the stator is rotational.

7. The half-bridge variable differential transformer position sensing system of claim 1, further comprising signal conditioning circuitry to make a transducer output signal suitable for analog-to-digital conversion.

8. The half-bridge variable differential transformer position sensing system of claim 7, wherein the signal conditioning circuitry for making the transducer output signal suitable for analog-to-digital conversion includes circuitry configured to rectify and smooth the transducer output signal.

9. The half-bridge variable differential transformer position sensing system of claim 7, wherein the microcontroller is programmed to rectify and smooth the transducer output signal.

10. The half-bridge variable differential transformer position sensing system of claim 7, further comprising one or more analog-to-digital converters coupled to the signal conditioning circuitry.

11. The half-bridge variable differential transformer position sensing system of claim 7, wherein the signal conditioning circuitry includes AC signal conditioning circuitry and DC signal conditioning circuitry.

12. The half-bridge variable differential transformer position sensing system of claim 1, wherein the microcontroller is programmed to correct for variations in the voltage of the output signal due to the temperature of the transducer by using a temperature correction table to calculate a temperature correction factor.

13. The half-bridge variable differential transformer position sensing system of claim 1, wherein the microcontroller is programmed to correct for variations in the voltage of the output signal due to non-linear effects on the output signal caused by movement of the magnetically permeable core by using a calibration table to calculate a linearity compensation factor.

14. The half-bridge variable differential transformer position sensing system of claim 1, further comprising a DC reference signal generator coupled between the transducer and the microcontroller, wherein an output of the DC reference signal generator is included in the excitation signal.

15. The half-bridge variable differential transformer position sensing system of claim 14, wherein the microcontroller is programmed to detect short circuits and open circuits in the inductive coil by comparing the actual DC bias in the transducer output signal to the expected DC bias.

16. The half-bridge variable differential transformer position sensing system of claim 1, further comprising an AC reference signal generator coupled between the transducer and the microcontroller, wherein an output of the AC reference signal generator is included in the excitation signal.

17. The half-bridge variable differential transformer position sensing system of claim 1, wherein the microcontroller is configured to provide an digital output signal providing positional data for a member physically connected to the magnetically permeable core.

18. The half-bridge variable differential transformer position sensing system of claim 17, wherein data of the digital output signal is transmitted serially in using one of the RS-232, ARINC 429, MIL-STD 1553, and CAN-bus communications standards.

19. The half-bridge variable differential transformer position sensing system of claim 18, further comprising a line driver configured to provide the digital output signal to an on-board computer.

20. A non-contact method of sensing position using a variable differential transformer position sensing system, comprising:
    providing a transducer having an inductive coil which supplies a transducer output signal;
    attaching a part, whose position is to be sensed, to a magnetically permeable core located within the inductive coil;

generating an excitation voltage to be applied to the inductive coil;

measuring variation in transducer output signal voltage resulting from a movement of the magnetically permeable core;

correcting for effects of temperature and non-linearity when determining a degree of movement of the magnetically permeable core; and providing no more than three wires as an electrical interface for the transducer of the variable differential transformer position sensing system.

21. The method of claim 20, wherein measuring variation in transducer output signal voltage resulting from a movement of the magnetically permeable core comprises measuring variation in transducer output signal voltage resulting from linear movement of the magnetically permeable core.

22. The method of claim 20, wherein measuring variation in transducer output signal voltage resulting from a movement of the magnetically permeable core comprises measuring variation in transducer signal voltage resulting from rotational movement of the magnetically permeable core.

23. The method of claim 20, further comprising:
conditioning the transducer output signal to make the signal suitable for analog-to-digital conversion;
converting the transducer output signal from analog to digital form; and
inputting the digital form of the transducer output signal into signal processing algorithms in a microcontroller.

24. The method of claim 23, wherein conditioning the transducer output signal comprises providing circuitry for AC signal conditioning and for DC signal conditioning.

25. The method of claim 24, wherein providing circuitry for AC signal conditioning and for DC signal conditioning comprises circuitry for AC and DC signal conditioning that is coupled between the transducer and a microcontroller.

26. The method of claim 20, wherein providing a transducer having an inductive coil comprises providing a transducer with a stator having a pair of inductive coils wound on a bobbin, the pair of coils connected in series with a center tap located between the pair of coils.

27. The method of claim 20, wherein providing no more than three wires as an electrical interface comprises providing a first wire to supply the excitation signal to the inductive coil, providing a second wire as a ground wire connected to the inductive coil, and providing a third wire to carry the transducer output signal.

28. The method of claim 20, further comprising detecting short circuits or open circuits in the inductive coil by comparing a measured DC bias in the transducer output signal to an expected DC bias for the transducer output signal.

29. The method of claim 20, wherein correcting for effects of temperature comprises programming a microcontroller to calculate a temperature correction factor using a temperature correction table.

30. The method of claim 20, wherein correcting for effects of non-linearity comprises programming a microcontroller to calculate a linearity compensation factor using a calibration table.

* * * * *